(12) United States Patent
Glueck (10) Patent No.: US 12,147,645 B2
(45) Date of Patent: Nov. 19, 2024

(54) LOGICAL STRUCTURE-BASED DOCUMENT NAVIGATION

(71) Applicant: AUTODESK, INC., San Francisco, CA (US)

(72) Inventor: Michael Glueck, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 276 days.

(21) Appl. No.: 14/187,994

(22) Filed: Feb. 24, 2014

(65) Prior Publication Data

US 2015/0242377 A1 Aug. 27, 2015

Related U.S. Application Data

(60) Provisional application No. 61/771,748, filed on Mar. 1, 2013.

(51) Int. Cl.
*G06F 3/00* (2006.01)
*G06F 3/03* (2006.01)
*G06F 3/0482* (2013.01)
*G06F 40/14* (2020.01)

(52) U.S. Cl.
CPC .......... *G06F 3/0482* (2013.01); *G06F 3/0304* (2013.01); *G06F 3/0312* (2013.01); *G06F 40/14* (2020.01)

(58) Field of Classification Search
CPC .... G06F 17/2247; G06F 17/24; G06F 17/211; G06F 3/0482; G06F 3/0304; G06F 3/0312; G06F 40/14
USPC ........................................................ 715/234
See application file for complete search history.

(56) References Cited

U.S. PATENT DOCUMENTS

| | | | | |
|---|---|---|---|---|
| 5,933,841 A | * | 8/1999 | Schumacher | G06F 3/0489 715/236 |
| 6,199,098 B1 | * | 3/2001 | Jones | G06F 16/9558 719/310 |
| 7,030,890 B1 | * | 4/2006 | Jouet | G06F 9/451 345/619 |

(Continued)

OTHER PUBLICATIONS

Table of contents From Wikipedia, the free encyclopedia, https://en.wikipedia.org/wiki/Table_of_contents, last edited date: May 7, 2017, at 18:55., see attachment "14187994_NPL_Table_of_contents. pdf".*

(Continued)

*Primary Examiner* — Roberto Borja
*Assistant Examiner* — David Faber
(74) *Attorney, Agent, or Firm* — Artegis Law Group, LLP (57) ABSTRACT

Embodiments include a method for navigating an electronic document. The method includes displaying a navigation pane that includes a group of logical document elements associated with the electronic document. The method also includes detecting a first user input. The method further includes determining that the first user input is configured to select a first logical document element included in the group of logical document elements. The method also includes selecting the first logical document element based on the first user input. The method further includes navigating to a portion of the document associated with the first logical document element. Embodiments also include a system and a computer-readable medium for navigating an electronic document.

25 Claims, 7 Drawing Sheets

(56) References Cited

U.S. PATENT DOCUMENTS

| | | | | |
|---|---|---|---|---|
| 7,162,488 | B2* | 1/2007 | DeVorchik | G06F 17/301 |
| 7,707,505 | B1* | 4/2010 | Ohrt | G06F 16/972 |
| | | | | 715/738 |
| 8,527,943 | B1* | 9/2013 | Chiluvuri | G06F 8/36 |
| | | | | 717/106 |
| 9,035,949 | B1* | 5/2015 | Oberheu | G06T 11/206 |
| | | | | 345/440 |
| 9,176,933 | B2* | 11/2015 | Kotler | G06F 16/4393 |
| 10,203,835 | B2* | 2/2019 | Dong | G06F 3/0481 |
| 2002/0054123 | A1 | 5/2002 | Walden | G06F 9/4446 |
| | | | | 715/781 |
| 2003/0174170 | A1* | 9/2003 | Jung | H04N 5/85 |
| | | | | 715/767 |
| 2004/0015566 | A1* | 1/2004 | Anderson | G06Q 20/042 |
| | | | | 709/219 |
| 2004/0086833 | A1* | 5/2004 | Goldberg | G09B 7/00 |
| | | | | 434/118 |
| 2005/0034056 | A1* | 2/2005 | Rubin | G06F 17/3089 |
| | | | | 715/206 |
| 2005/0182773 | A1* | 8/2005 | Feinsmith | G06Q 10/10 |
| 2006/0123361 | A1* | 6/2006 | Sorin | G06F 17/30873 |
| | | | | 715/854 |
| 2006/0242604 | A1* | 10/2006 | Wong | G06F 17/30126 |
| | | | | 715/854 |
| 2007/0186186 | A1* | 8/2007 | Both | G06F 3/04817 |
| | | | | 715/821 |
| 2007/0198935 | A1* | 8/2007 | Constantine | G06F 3/0485 |
| | | | | 715/744 |
| 2008/0134015 | A1* | 6/2008 | Milic-Frayling | G06F 16/9558 |
| | | | | 715/206 |
| 2009/0007003 | A1* | 1/2009 | Dukhon | G06F 3/0481 |
| | | | | 715/778 |
| 2009/0178009 | A1* | 7/2009 | Dotson | G06F 16/904 |
| | | | | 715/841 |
| 2009/0235187 | A1* | 9/2009 | Kim | G06F 16/9577 |
| | | | | 715/760 |
| 2010/0064258 | A1* | 3/2010 | Gorczowski | G06F 3/0482 |
| | | | | 715/841 |
| 2010/0070930 | A1* | 3/2010 | Thibault | G06Q 10/10 |
| | | | | 715/854 |
| 2010/0077320 | A1* | 3/2010 | Lepore | G06F 40/103 |
| | | | | 715/760 |
| 2010/0162174 | A1* | 6/2010 | Karidi | G06F 3/048 |
| | | | | 715/854 |
| 2010/0251175 | A1* | 9/2010 | Brunkhorst | G06F 3/0482 |
| | | | | 715/811 |
| 2011/0010665 | A1* | 1/2011 | DeLuca | G06Q 10/107 |
| | | | | 715/810 |
| 2011/0055357 | A1* | 3/2011 | Kakuta | G06F 17/30873 |
| | | | | 709/219 |
| 2012/0311502 | A1* | 12/2012 | Reyna | G06F 8/38 |
| | | | | 715/841 |
| 2013/0073998 | A1* | 3/2013 | Migos | G06F 17/24 |
| | | | | 715/776 |
| 2013/0086056 | A1* | 4/2013 | Dyor | G06F 3/167 |
| | | | | 707/730 |
| 2013/0097490 | A1* | 4/2013 | Kotler | G06F 40/10 |
| | | | | 715/255 |
| 2013/0125040 | A1* | 5/2013 | Smith | G06F 9/4443 |
| | | | | 715/781 |
| 2013/0151974 | A1* | 6/2013 | Cho | G06F 17/212 |
| | | | | 715/733 |
| 2013/0219340 | A1* | 8/2013 | Linge | G06F 3/04883 |
| | | | | 715/834 |
| 2013/0346907 | A1* | 12/2013 | Arend | G06F 3/0481 |
| | | | | 715/779 |
| 2014/0157200 | A1* | 6/2014 | Jeon | G06F 3/04886 |
| | | | | 715/834 |
| 2015/0052459 | A1* | 2/2015 | Sunil | G06F 3/0482 |
| | | | | 715/760 |

OTHER PUBLICATIONS

Adobe, "End of support for Acrobat X and Reader X", Retrieved from https://helpx.adobe.com/acrobat/kb/end-of-support-acrobat-x-reader-x.html, on Jan. 23, 2024, 4 pages.

Alexander et al., "Revisiting Read Wear: Analysis, Design, and Evaluation of a Footprints Scrollbar", CHI Desktop Techniques, Apr. 8, 2009, pp. 1665-1674.

Alexander et al., "An Empirical Characterisation of Electronic Document Navigation", Graphics Interface Conference, May 28-30, 2008, pp. 123-130.

Alexander et al., "AppMonitor: A Tool for Recording user Actions in Unmodified Windows Applications", Behavior Research Methods, doi: 10.3758/BRM.40.2.413, vol. 40, No. 2, 2008, pp. 413-421.

Balakrishnan et al., "The Rockin'Mouse: Integral 3D Manipulation on a Plane", CHI 97, Mar. 22-27, 1997, pp. 311-318.

Buxton, William, "Chunking and Phrasing and The Design Of Human-Computer Dialogues", Proceedings of the IFIP World Computer Congress, 1986, pp. 475-480. (8 pages total).

Byrd, Donald, "A Scrollbar-based Visualization for Document Navigation", In Proc. DL'99, 1999, pp. 122-129.

Cockburn et al., "A Predictive Model of Human Performance with Scrolling and Hierarchical Lists", 2009, 39 pages.

Cockburn et al., "Faster Document Navigation with Space-Filling Thumbnails", CHI, Apr. 22-27, 2006, 10 pages.

Cockburn et al., "Tuning and Testing Scrolling Interfaces that Automatically Zoom", CHI, Apr. 2-7, 2005, 10 pages.

Dorum et al., "Efficient Electronic Navigation: A Metaphorical Question?", Interacting with Computers, doi: 10.1016/j.intcom.2010.11.003, vol. 23, 2011, pp. 129-136.

Furuta, R., "An Object-based Taxonomy for Abstract Structure in Document Models", The Computer Journal, vol. 32, No. 6, 1989, pp. 494-504.

Hinckley et al., "Quantitative Analysis of Scrolling Techniques", vol. 4, Issue No. 1, Apr. 20-25, 2002, pp. 65-72.

HornbÆK et al., "Reading Patterns and Usability in Visualizations of Electronic Documents", ACM Transactions on Computer-Human Interaction, vol. 10, No. 2, Jun. 2003, pp. 119-149.

Igarashi et al., "Speed-dependent Automatic Zooming for Browsing Large Documents", UIST, vol. 2, No. 2, 2000, pp. 139-148.

Ishak et al., "Content-Aware Scrolling", UIST'06, Oct. 15-18, 2006, pp. 155-158.

Klein et al., "Benefits of Animated Scrolling", CHI, Late Breaking Results: Short Papers, Apr. 2-7, 2005, pp. 1965-1968.

Kobayashi et al., "MoreWheel: Multimode Scroll-Wheeling Depending on the Cursor Location", UIST Adjunct Proceedings: Demonstrations, Oct. 15-18, 2006, pp. 57-58.

Microsoft, "Using IntelliSense", Visual Studio, Retrieved from http://msdn.microsoft.com/en-us/library/hcw1s69b.aspx, Nov. 15, 2016, 4 pages.

Peels et al., "Document Architecture and Text Formatting", ACM Transactions on Office Information Systems, vol. 3, No. 4, Oct. 1985, pp. 347-369.

Sun et al., "Flipper: a New Method of Digital Document Navigation", CHI, Late Breaking Results: Short Papers, Apr. 2-7, 2005, pp. 2001-2004.

Sutherland, Ivan E., "Sketchpad A Man-Machine Graphical Communication System", Proceedings—Spring Joint Computer Conference, 1963, pp. 329-346.

Tashman et al., "LiquidText: A Flexible, Multitouch Environment to Support Active Reading", Session: Tabletop & Wall Displays, May 7-12, 2011, pp. 3285-3294.

Thayer et al., "The Imposition and Superimposition of Digital Reading Technology: The Academic Potential of E-readers", Session: Reading & Writing, May 7-12, 2011, pp. 2917-2926.

Microsoft, "Navigate blog", Microsoft 365 Blog, Retrieved from https://www.microsoft.com/en-in/microsoft-365/blog/, on Jan. 23, 2024, 7 pages.

Zhai et al., "Human Performance Evaluation of Manipulation Schemes in Virtual Environments", Proceedings of IEEE Virtual Reality Annual International Symposium, Sep. 1993, 8 pages.

(56) References Cited

OTHER PUBLICATIONS

Zhai et al., "Improving Browsing Performance: A study of four input devices for scrolling and pointing tasks", Human-Computer Interaction: Interact'97, 1997, pp. 286-293.
Alexander, Jason, "Understanding and Improving Navigation Within Electronic Documents", Ph.D. Thesis, Department of Computer Science and Software Engineering, 2009, 413 pages.

* cited by examiner

LOGICAL STRUCTURE-BASED DOCUMENT NAVIGATION

CROSS-REFERENCE TO RELATED APPLICATIONS

This application claims the priority benefit of U.S. Provisional Patent Application Ser. No. 61/771,748, titled "META-SCROLL LOGICAL STRUCTURE-BASED DOCUMENT NAVIGATION WITH THE MOUSE-WHEEL" and filed Mar. 1, 2013. The subject matter of this related application is hereby incorporated herein by reference in its entirety.

BACKGROUND OF THE INVENTION

Field of the Invention

The invention relates generally to computer software and, more specifically, to logical structure-based document navigation.

Description of the Related Art

Users create electronic documents in a variety of different computer-based applications, such as word processors, spreadsheets, image editors, and computer-aided design (CAD) applications. While editing such documents, users typically navigate to various areas within the document based on the "physical structure" of the document. The physical structure is the order and arrangement of the various content-based elements in the document. For example, in a word processing document, the physical structure consists of the order of words, sentences, paragraphs, pages, and the like. In a document including a three-dimensional graphics-based model, the physical structure consists of the relative locations of the different parts of the graphics-based model. Documents also have "logical structures," which include logical relationships among elements such as a natural order or hierarchy.

When a user navigates the physical structure of a document, navigating to places that are relatively close to the location where the user is currently editing is usually straight-forward. However, navigating to a more distant location in the document may involve traversing the document with a long-distance tool, such as a scroll bar. These types of traversal operations normally involve some amount of overshoot, followed by iterative corrective actions to finally arrive at the new location where the user wants to edit or perform some sort of operation. Thus, physical structure-based navigation to an arbitrary and specific location in a document may be a slow and/or cumbersome operation that is not terribly user-friendly.

As the foregoing illustrates, what is needed in the art are improved techniques for navigating electronic documents.

SUMMARY OF THE INVENTION

Embodiments include a method for navigating an electronic document. The method includes displaying a navigation pane that includes a group of logical document elements associated with the electronic document. The method also includes detecting a first user input. The method further includes determining that the first user input is configured to select a first logical document element included in the group of logical document elements. The method also includes selecting the first logical document element based on the first user input. The method further includes navigating to a portion of the document associated with the first logical document element. Embodiments also include a system and a computer-readable medium for navigating an electronic document.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
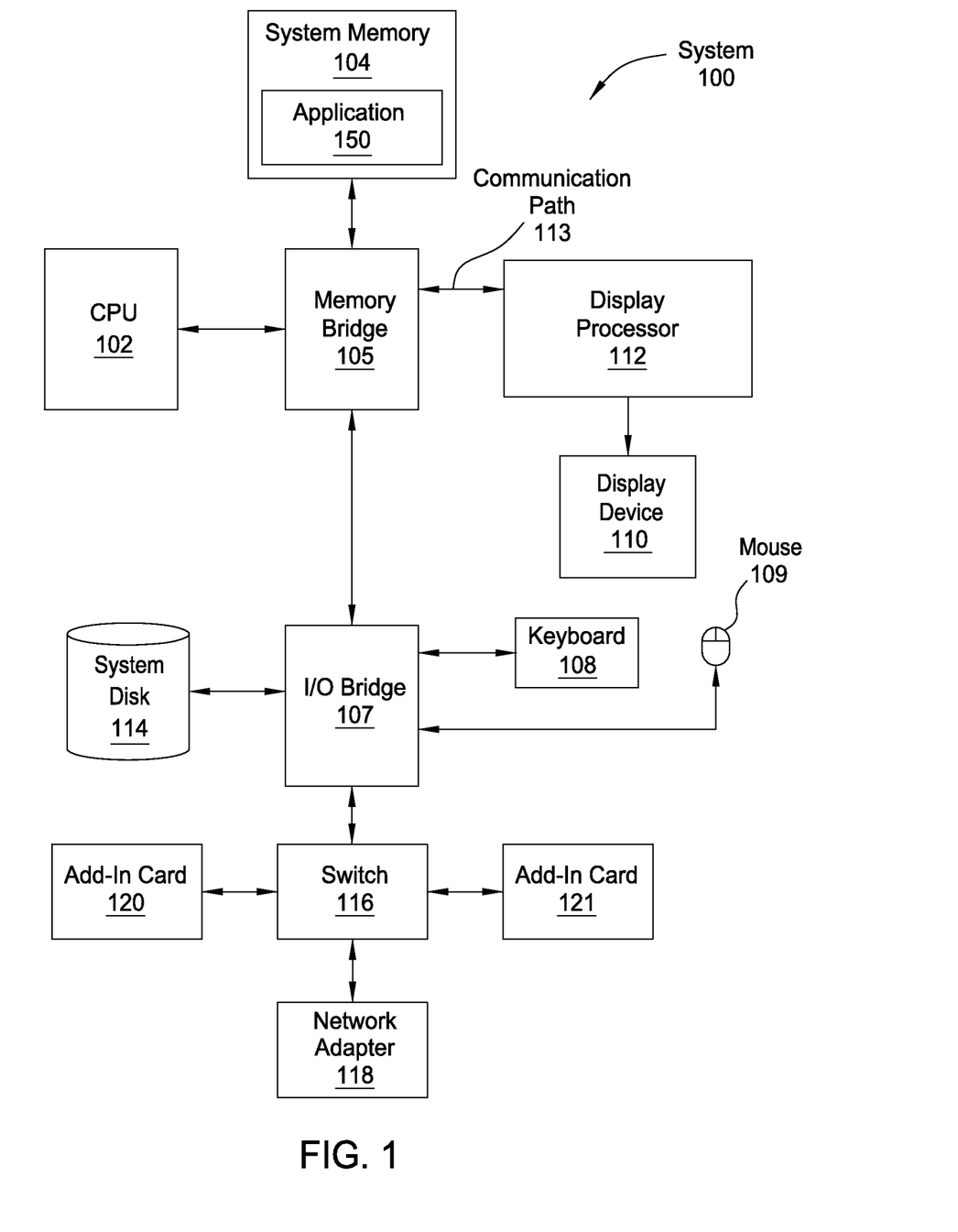
FIG. 1 is a block diagram of a system configured to implement one or more aspects of the present invention.

FIG. 1 is a block diagram of a system 100 configured to implement one or more aspects of the present invention. System 100 may be a computer workstation, personal computer, or any other device suitable for practicing one or more embodiments of the present invention. As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or a graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 150 is stored in system memory 104. Application 150 may be any application configured to display a graphical user interface (GUI) on display device 110. Application 150 may be configured to generate and modify documents based on input received from a user. For example, application 150 may be a word processing application or an image editing program.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

As described above, application 150 allows a user to edit electronic documents by accepting input from the user and displaying the user edits on a screen, such as display device 110. In one embodiment, application 150 is a word-processing program that accepts user keyboard and mouse inputs and displays text and/or graphics data to the user. During such editing operations, the user may wish to navigate to various locations within the document. The following disclosure describes techniques for logical structure-based document navigation, which allow a user to navigate to locations within a document based on a logical structure of the document. Such a logical structure of the document may be a hierarchical model, a figures-based model, or other models as are described below.

Figure 2A:
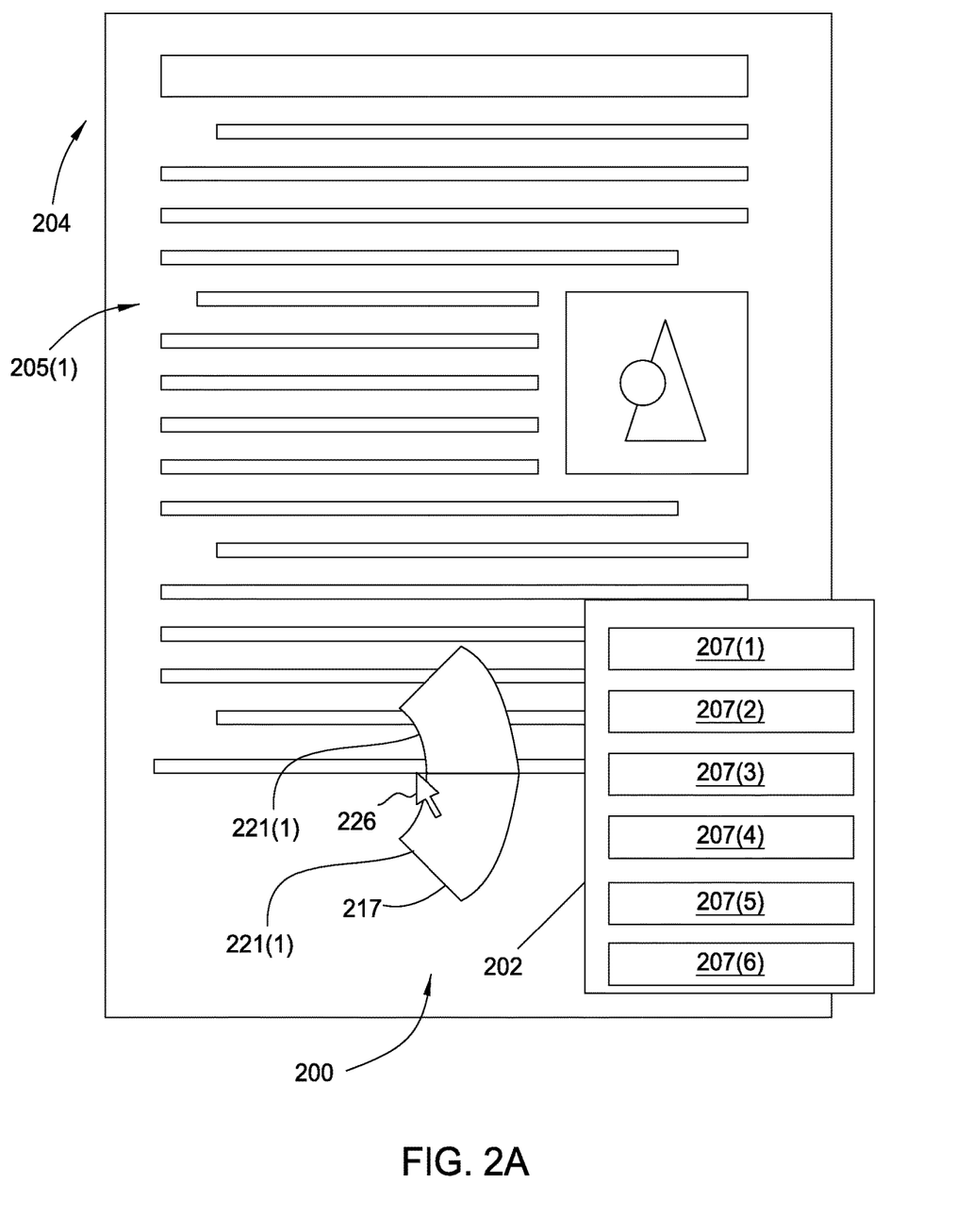
FIG. 2A is an illustration of a navigation interface for logical structure-based document navigation, according to one embodiment of the present invention.

FIG. 2A is an illustration of a navigation interface 200 for logical structure-based document navigation, according to one embodiment of the present invention. As shown, the navigation interface 200 includes a navigation tool 217 and a navigation pane 202, which are depicted in the context of a document 204 that is displaying content at a particular document location 205(1).

Document 204 is an electronic document that includes document content that is editable by a user. Such content may include, for example, text, images, drawings, models, or any other content that can be edited by a user as is generally known. Document 204 has a "physical structure," which describes the physical positions of content in the document 204. For example, for a document consisting primarily of text, such as a word processing document, the physical structure may consist of the word-by-word order of the text on a page of the word processing document. As another example, for a document consisting of a model of a three-dimensional scene, the physical structure may consist of the physical positions of the objects within the model.

Document 204 also has a "logical structure," which describes logical positions of content within the document. These logical positions correspond to "logical document elements" 207 that are depicted in navigation pane 202. For example, for a word processing document, a logical structure may consist of a document outline including headings, sub-headings, sub-sub-headings, and the like. The logical document elements 207 may include any of the headings, sub-headings, and the like. The document outline may be pre-defined by a user or by software. The logical structure may alternatively include the logical order of figures within the document. In such an example, the figures would be the logical document elements 207. In another example, for a document consisting of a model of a three-dimensional scene, the logical structure may consist of handles (identifiers) to the objects within the three-dimensional scene (as opposed to the physical positions of these objects, as with the physical structure). In this example, the logical document elements 207 would include the various objects of the three-dimensional scene. Documents 204 may have multiple different logical structures where each logical structure corresponds to a different type of content that corresponds to the logical document elements 207.

The navigation interface 200 allows a user to quickly and easily navigate between different document locations 205 of a document 204. More specifically, the navigation interface 200 includes a navigation pane 202 that displays logical document elements 207. When the application 150 is displaying the navigation pane 202, the application 150 is able to receive input from a user for selecting one of the logical document elements 207. When such input is received, application 150 navigates to a document location 205 that is associated with the selected logical document element 207. Such input may include, without limitation, a mouse-wheel-scroll operation or a left-button mouse click operation.

The navigation tool 217 allows a user to select between different navigation panes 202 that display different types of logical document elements 207 associated with different logical structures of a document 204. The navigation tool 217 includes navigation pane selectors 221 for selecting different types of navigation panes 202.

Application 150 displays the navigation interface 200, including the navigation tool 217, upon receiving a user input configured to cause application 150 to display the navigation interface 200. Such a user input may include, without limitation, a middle button mouse-click operation. Subsequently, application 150 displays a navigation pane 202 upon receiving a user input configured to cause application 150 to display a particular navigation pane 202. Such a user input may include, without limitation, a mouse-over operation or a left button mouse-click operation.

Together, the elements of the navigation interface 200 allow a short sequence of user input to quickly and accurately navigate to distant document locations 205. In one example, application 150 receives a middle mouse button click, and in response displays the navigation interface 200. Subsequently, application 150 receives a user input including a mouse-over operation targeting a navigation pane selector 221 and in response displays a navigation pane 202. Subsequently, application 150 receives a user input including a mouse-scroll operation, which causes application 150 to select a particular logical document element 207, and to navigate to a portion of the document 204 associated with that logical document element 207 in response. Additional examples and details for allowing a user to quickly navigate to various locations in a document 204 are provided below.

Figure 2B:
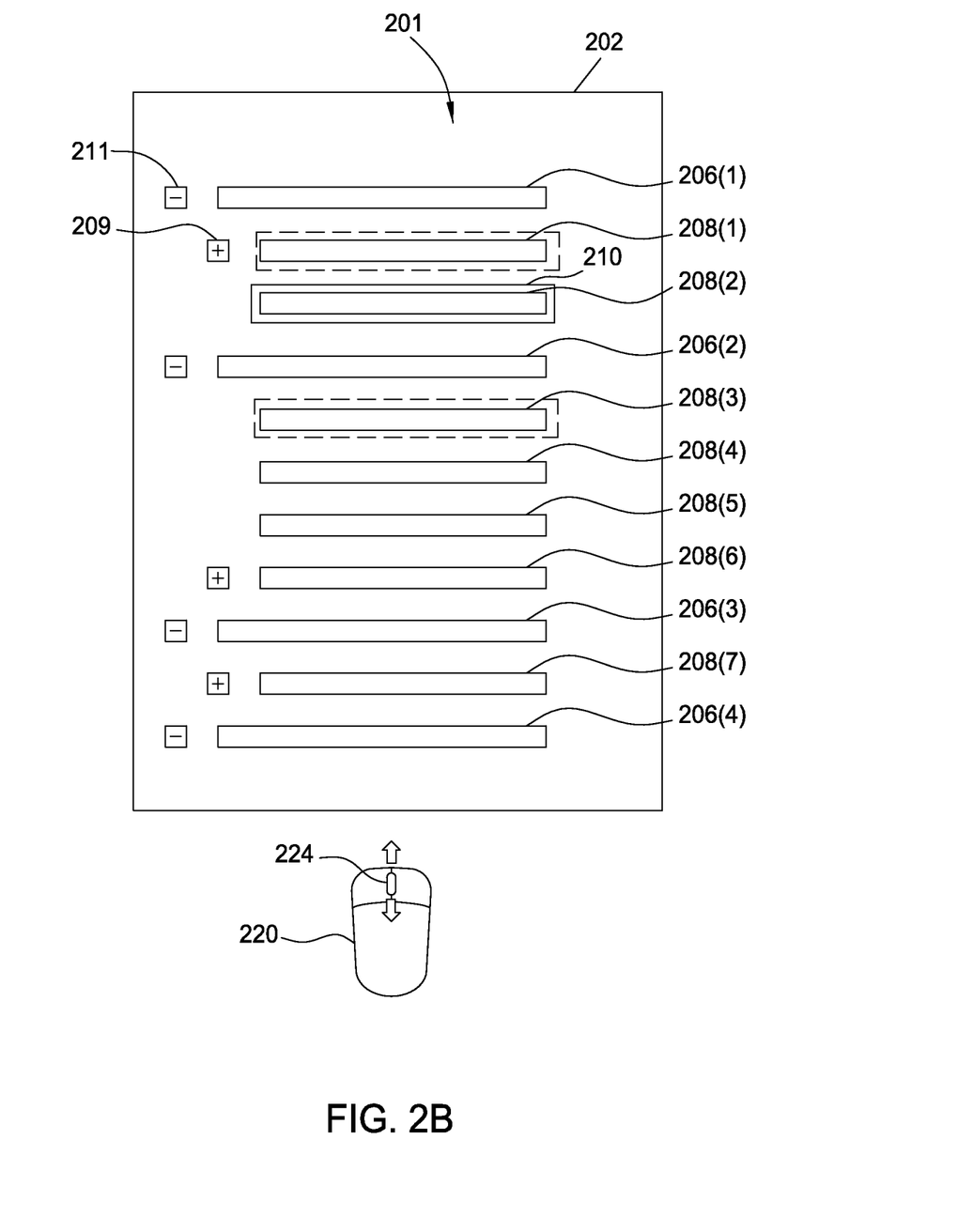
FIG. 2B is an illustration of a navigation pane displayed by the application of FIG. 1, according to one embodiment of the present invention.

FIG. 2B is an illustration of a navigation pane 202 displayed by application 150 that provides an interface for navigating between document locations 205 in document 204, according to one embodiment of the present invention. The navigation pane 202 displays a graphical representation of the logical structure of the document 204. More specifically, the navigation pane 202 displays a document hierarchy 201 associated with the logical structure of the document 204. In other embodiments of the navigation pane 202, the navigation pane 202 may display other information, such as figures (described below in conjunction with FIG. 2D). Any technically feasible content type may be displayed in navigation pane 202 and is covered by the scope of the invention.

The hierarchy 201 includes a number of first level elements 206 and a number of second level elements 208. The hierarchy 201 also includes elements at lower levels that are not shown. These additional hierarchy levels are not shown because the navigation pane 202 is currently set to a particular "current hierarchy level." The current hierarchy level may be changed, as is described in more detail below with respect to FIG. 2C. Generally speaking, levels that are lower-numbered are at higher levels in the hierarchy, and levels that are higher-numbered are at lower levels in the hierarchy. In FIG. 2B, the logical document elements 207 include the first level elements 206 and second level elements 208. A user may select among these logical document elements 207 as described in more detail below.

The current hierarchy level illustrated in FIG. 2B is the second hierarchy level. The hierarchy items that are displayed is based on the current hierarchy level. More specifically, for any particular current hierarchy level, all hierarchy items at or above that particular current hierarchy level are displayed. Hierarchy items below that particular hierarchy level are not displayed. In FIG. 2B, all first level elements 206 are expanded, and thus second level elements 208 are displayed. However, because the second hierarchy level is the current hierarchy level, no second level elements 208 are expanded, and thus no hierarchy items below the second level are displayed.

The hierarchy 201 includes expanded-indicator-icons 211 and unexpanded-indicator-icons 209. For any particular hierarchy item, an expanded-indicator-icon 211 indicates that the particular hierarchy item is expanded and that hierarchy items below that particular hierarchy item are displayed. For any particular hierarchy item, an unexpanded-indicator-icon 209 indicates that the particular hierarchy item is unexpanded and therefore that hierarchy items below that particular hierarchy item are not displayed. In various embodiments, the application 150 may not display the icons 209 and icons 211 in navigation pane 202.

In some embodiments, application 150 navigates between document locations associated with different logical document elements 207 in response to a user input received in the context of the navigation pane 202. In some embodiments, the user input is a mouse-scroll input. More specifically, the user input includes a user scrolling a mouse wheel 224 of a mouse 220 (mouse 220 may be the same as mouse 109). Scrolling the mouse wheel causes the application 150 to scroll through the hierarchy items of a current hierarchy level. The application 150 scrolls through neighboring hierarchy items of the current hierarchy level. A "neighboring element" refers to a hierarchy element directly above or directly below a current hierarchy element, in the current hierarchy level. In some embodiments, other user input, instead of scrolling a mouse wheel 224 of a mouse 220, may trigger document navigation.

In the example hierarchy 201 depicted in FIG. 2B, the hierarchy displays first level hierarchy items 206 and second level hierarchy items 208. The current hierarchy level is the second hierarchy level, associated with the second level hierarchy items 208. Because the current hierarchy level is the second hierarchy level, the application 150 scrolls through items of the second hierarchy level. Thus, when the mouse wheel 224 is scrolled down, application 150 moves a selected hierarchy item 210 from second level hierarchy item 208(2) to adjacent second level hierarchy item 208(3). The mouse-scroll operation may cause application 150 to navigate either to a hierarchy item below the current hierarchy item or above the hierarchy item, depending on the direction of the mouse-scroll. Thus, in the example depicted in FIG. 2B, application 150 may switch the current hierarchy item from item 208(2) to either item 208(1) or item 208(3), depending on the direction of the mouse-scroll.

When application 150 navigates to a particular hierarchy item, application 150 also navigates to the document location 205 in the document 204 (illustrated in FIG. 2A) that is associated with that particular hierarchy item. In one example, a document may include headings I, II, and III, and heading I may include sub-headings a and b. If a user is currently viewing a portion of the document in sub-heading I(a), and performs a downward mouse-scroll operation in the context of navigation pane 202, then application 150 would change the current hierarchy item from I(a) to I(b), and would navigate to a portion of the document 204 associated with sub-heading I(b). More specifically, application 150 would navigate such that content under the sub-heading I(b) is displayed for a user.

Figure 2C:
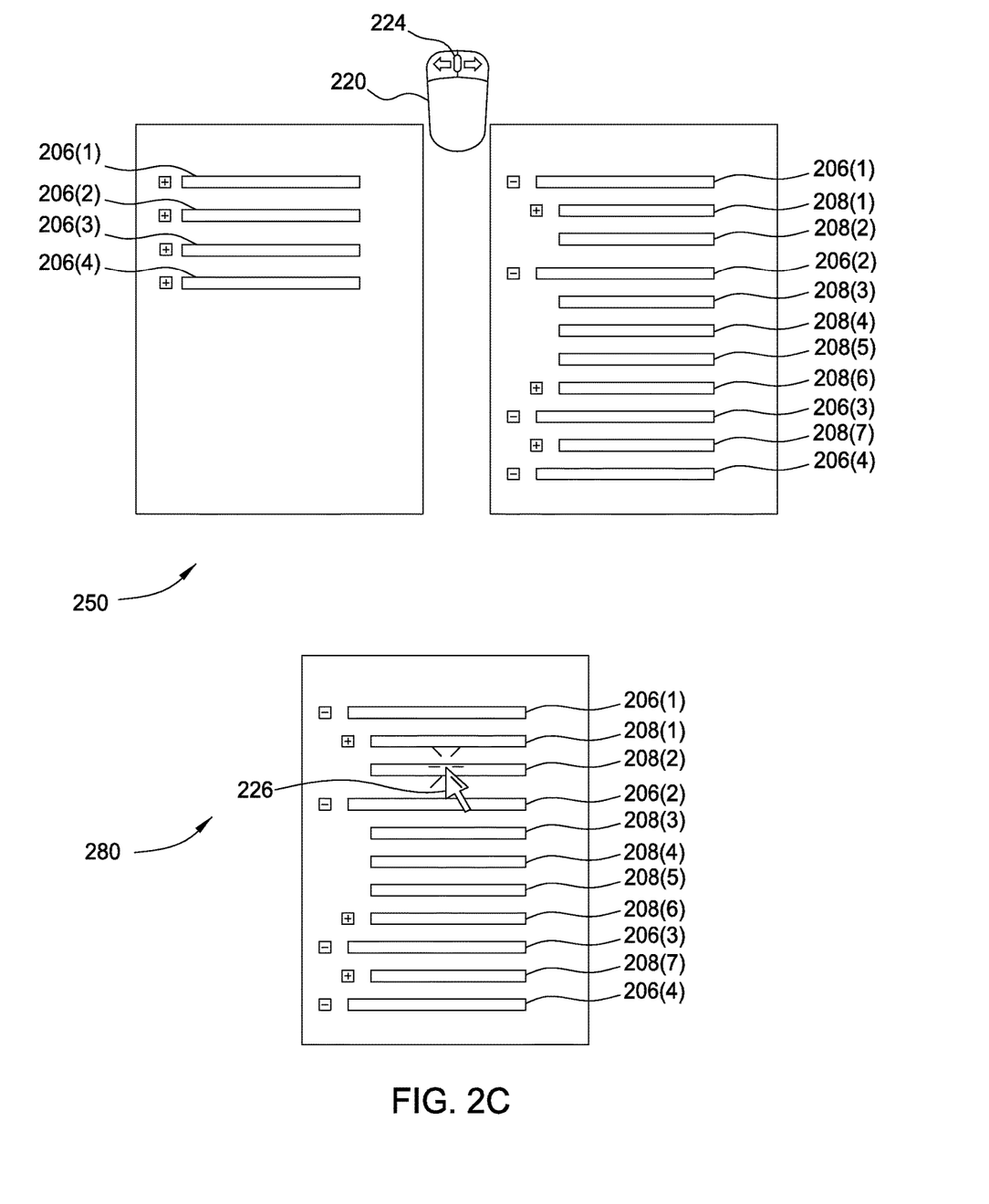
FIGS. 2C-2D include illustrations of additional operations associated with document navigation, according to one embodiment of the present invention.

FIG. 2C is an illustration of additional operations associated with document navigation, according to one embodiment of the present invention. As shown, FIG. 2C illustrates an operation 250 for changing a current hierarchy level as well as a direct-navigation operation 280 for navigating to different hierarchy items based on a mouse-click user input.

While an application 150 is accepting input from a user, the user may wish to change the current hierarchy level. Changing the current hierarchy level allows a user to navigate between hierarchy items of various hierarchy levels. To transition between hierarchy levels, the application 150 executes a hierarchy level switch operation 250. In one embodiment, a hierarchy level switch operation 250 is triggered by user input including a user tilting the middle mouse button to the left or to the right. Tilting the middle mouse button to the left decreases the current hierarchy level, thereby decreasing the number of hierarchy items that are displayed. Tilting the middle mouse button to the right increases the current hierarchy level, thereby increasing the number of hierarchy items that are displayed.

When the current hierarchy level is changed, the navigation pane 202 alters the hierarchy items that are displayed. More specifically, the navigation pane 202 displays hierarchy items that are at or above the current hierarchy level, but does not display hierarchy items that are below the current hierarchy level. Thus, if the current hierarchy level is changed from level-two to level-three, then the navigation pane 202 displays hierarchy items in levels one, two, and three, but not hierarchy items in any levels above level three.

In some embodiments, when the current hierarchy level is changed, the current hierarchy item 210 is changed to reflect the hierarchy item of the current level that is closest to the content currently shown in the document 204. Additionally, in some embodiments, when application 150 adjusts the items displayed in navigation pane 202 such that the current hierarchy item 210 is centered in the navigation pane 202.

The direct-navigation operation 280 is triggered when application 150 receives user input including a mouse-click targeting a particular hierarchy item in navigation pane 202. In response to receiving such input, the application 150 navigates to the portion of the document associated with the targeted hierarchy item. In one example, a document may include headings I, II, and III, and heading I may include sub-headings a and b. If a user is currently viewing a portion of the document in sub-heading I(a), and clicks on a hierarchy element associated with sub-heading I(b), then application 150 would change the current hierarchy item from I(a) to I(b), and would navigate to a portion of the document 204 associated with hierarchy item I(b). More specifically, application 150 would navigate such that content under the sub-heading I(b) is displayed for a user.

Figure 2D:
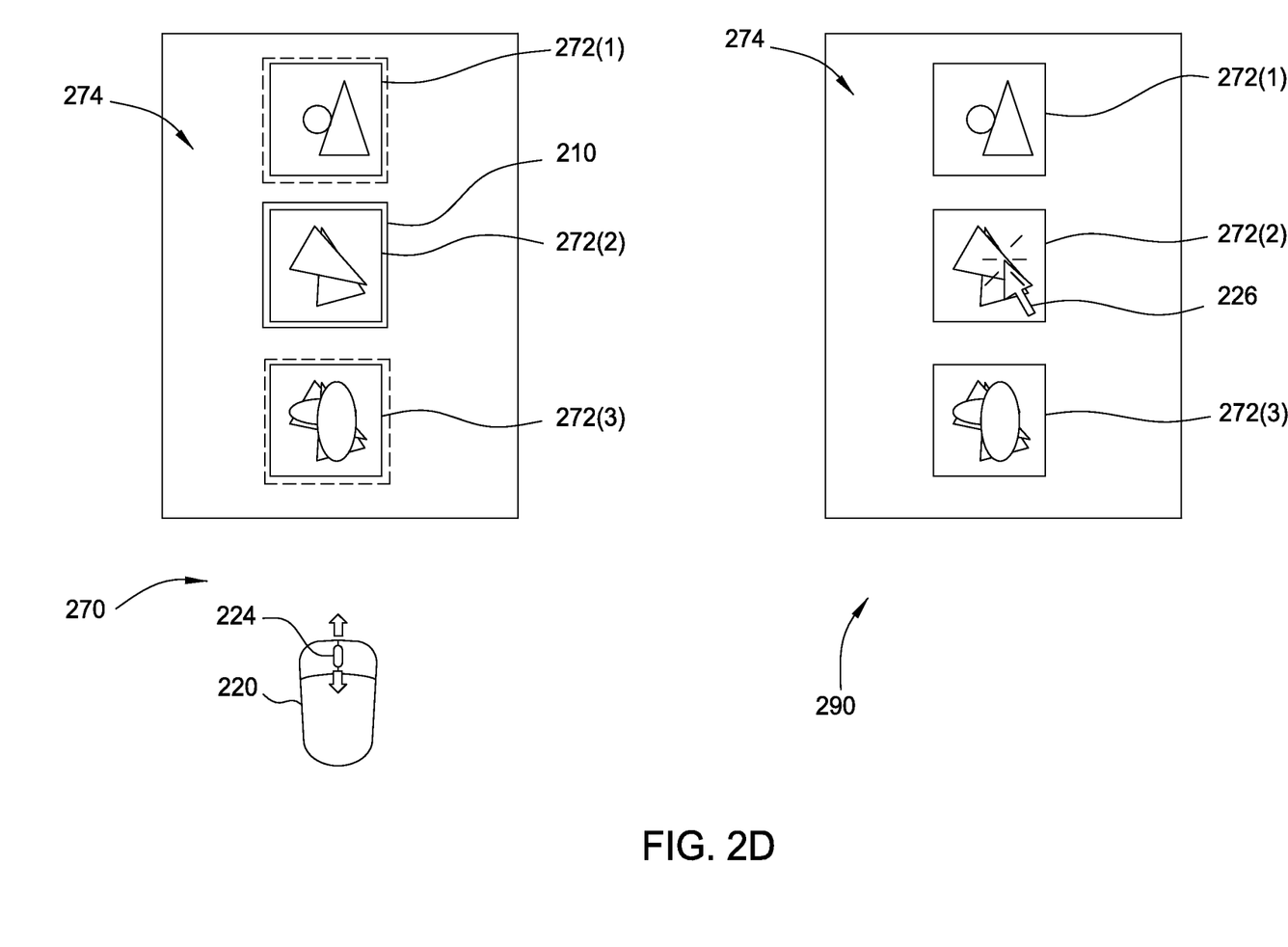

FIG. 2D is an illustration of additional operations associated with document navigation, according to another embodiment of the present invention. As shown, the illustration depicts a first technique 270 for navigating to a location in a document and a second technique 290 for navigating to a location in a document. In both the first technique 270 and the second technique 290, a navigation pane 202 includes a series of figures for navigating content of a document 204.

As described above, in both the first technique 270 and the second technique 290, the navigation pane 202 displays a sequence 274 of FIG. 272. These FIG. 272 correspond to the logical document elements 207 described with respect to FIG. 2A. The FIG. 272 represent figures located in a word-processing document or in another type of document. In both the first technique 270 and the second technique 290, the application 150 initially displays content associated with a "current figure." More specifically, the application 150 initially displays text or other content that is in the same approximate location as one of the figures in the document, which is deemed to be the current figure. Further, in both the first technique 270 and the second technique 290, the application 150 receives a user input configured to cause the application 150 to navigate to a portion of the document 204 associated with a different FIG. 272. In some embodiments, the application 150 may display the current figure in the navigation pane 202 in an enlarged manner, such that the current figure is larger than the other figures displayed in the navigation pane 202.

In the first technique 270, the application 150 accepts input consisting of a mouse-scroll operation in the context of the navigation pane 202. When the application 150 detects the mouse-scroll operation, the application 150 determines the current FIG. 272 and selects a neighboring FIG. 272 based on the direction of the mouse-scroll operation. If the mouse-scroll operation is in an upwards direction, then the application 150 selects a new FIG. 272 that is before the current FIG. 272 in the document. Similarly, if the mouse-scroll operation is in a downwards direction, then the application 150 selects a new FIG. 272 that is after the current FIG. 272 in the document. Also in response to the mouse-scroll operation, the application 150 navigates the document 204 to the portion of the document associated with the new FIG. 272. More specifically, the application 150 navigates the document 204 to the portion of the document that is at or near the new FIG. 272.

In the second technique 290, the application 150 accepts input consisting of a mouse-click operation that targets a particular FIG. 272 displayed in the navigation pane 202. When the application 150 detects the mouse-click operation, the application 150 determines which FIG. 272 the mouse-click operation targets. Subsequently, the application 150 selects, as a new FIG. 272, the figure that is targeted by the mouse-click operation. The application 150 then navigates the document 204 to the portion of the document associated with the new FIG. 272. More specifically, the application 150 navigates the document 204 to the portion of the document that is at or near the new FIG. 272.

Figure 3:
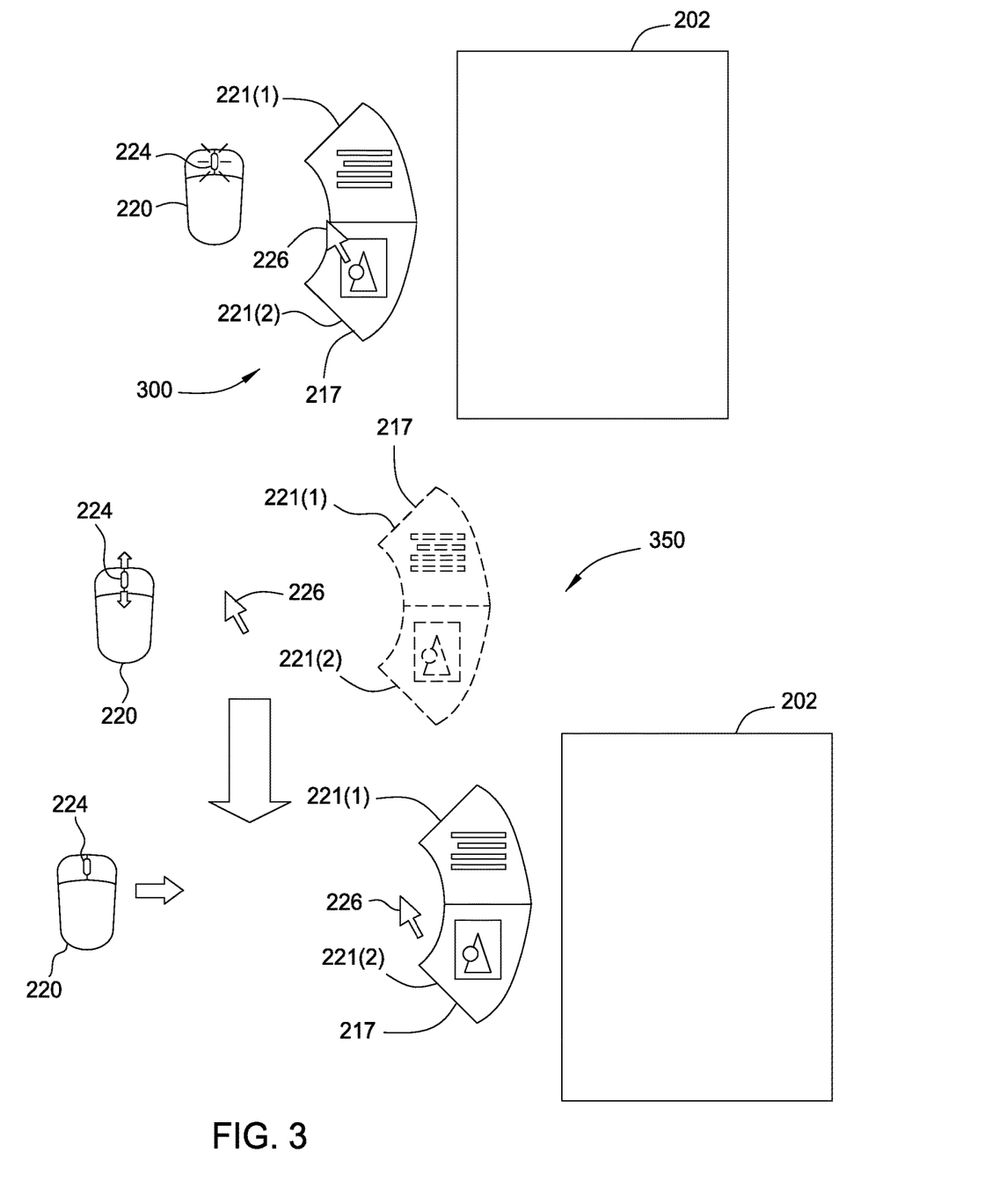
FIG. 3 illustrates a navigation tool configured for interacting with the navigation pane of FIGS. 2A-2D, according to one embodiment of the present invention.

FIG. 3 illustrates a navigation tool 217 configured for interacting with the navigation pane 202 of FIGS. 2A-2D, according to one embodiment of the present invention. As shown, the navigation tool 217 includes a first navigation pane selector 221(1) and a second navigation pane selector 221(2).

Application 150 displays the navigation tool 217 upon receiving a user input configured to activate the navigation tool 217. A first operation 300 for activating a navigation tool 217 and a second operation 350 for activating a navigation tool 217 are both illustrated in FIG. 3.

In the first operation 300, the application 150 detects a user input provided with a mouse 220. More specifically, when a user clicks a middle mouse button 224 of a mouse 220, the application 150 displays the navigation tool 217 at or near to the location of the mouse cursor 226. The navigation tool 217 is fully visible (and not transparent). If, when the navigation tool 217 is displayed after being activated via first operation 300, the user again clicks the middle mouse button 224, the application 150 dismisses the navigation tool 217.

In the second operation 350, the application 150 detects a different user input provided with a mouse 220. More specifically, when a user scrolls the middle mouse button ("mouse wheel") while viewing content on a particular document 204, the application 150 displays the navigation tool 217. Unlike the first operation 300, however, when the user scrolls the mouse wheel while viewing content on a particular document 204, application 150 displays the navigation tool 217 in a transparent or semi-visible form. Subsequently, when the user moves the mouse cursor 226 towards the location of the navigation tool 217, the application 150 displays the navigation tool 217 in a solid, fully visible form, which is now activated.

The navigation tool 217 includes a first navigation pane selector 221(1) and a second navigation pane selector 221(2). In other embodiments, the navigation tool 217 may include more or fewer than two navigation pane selectors 221. The navigation pane selectors 221 permit a user to choose between different types of navigation panes 202. Two navigation pane selectors 221 are illustrated in FIG. 3: a navigation pane selector 221(1) associated with a hierarchy-based navigation pane 202 and a navigation pane selector 221(2) associated with a figures-based navigation pane 202. A user may activate one of the navigation panes 202 by mousing over or clicking on the navigation pane selector 221 associated with a particular navigation pane 202. In one example, a user mouses over the first navigation pane selector 221(1), which is associated with a hierarchy-based navigation pane. In response to the user mousing over the first navigation pane selector 221(1), the application 150 displays a hierarchy-based navigation pane 202. In alternative embodiments, the user may activate a navigation pane selector 221 with keyboard input or with other types of input.

Once navigation pane 202 is activated, the operations described with respect to FIGS. 2A-2D may be performed. In some embodiments, the navigation tool 217 and navigation pane 202 remain in a fixed position as a user navigates through a document 204.

The operations and tools described with respect to FIGS. 2A-3 allow many types of quick and effective document navigation techniques to be executed by a user. In one example, a user, while editing a document 204, wishes to browse to a distant location in the document 204. The user clicks the middle mouse button 224, which causes application 150 to display the navigation tool 217. The user then mouses over a first navigation pane selector 221(1), which is associated with a document hierarchy. In response, application 150 displays the navigation pane 202 with the document hierarchy. In this example, the current hierarchy level of the hierarchy displayed in the navigation pane 202 is a first level of the hierarchy.

With the navigation pane 202 displayed, the user performs an operation to change the current hierarchy level to the second level. In response, the application 150 changes the current hierarchy level to the second level. The user also performs several mouse-scroll operations in the downwards direction to select a particular second level hierarchy item. Application 150 navigates to the document location 205 associated with that particular second level hierarchy item. Subsequently, the user performs another operation to change the current hierarchy level to the third level, for additional navigation precision, and performs several additional mouse-scroll operations in the downwards direction. In response, application 150 navigates to the document location 205 associated with the newly selected hierarchy item. At this point, the user has navigated to the desired location in the document and clicks the middle mouse button to dismiss the navigation tool 217, which also dismisses the navigation pane 202.

Figure 4:
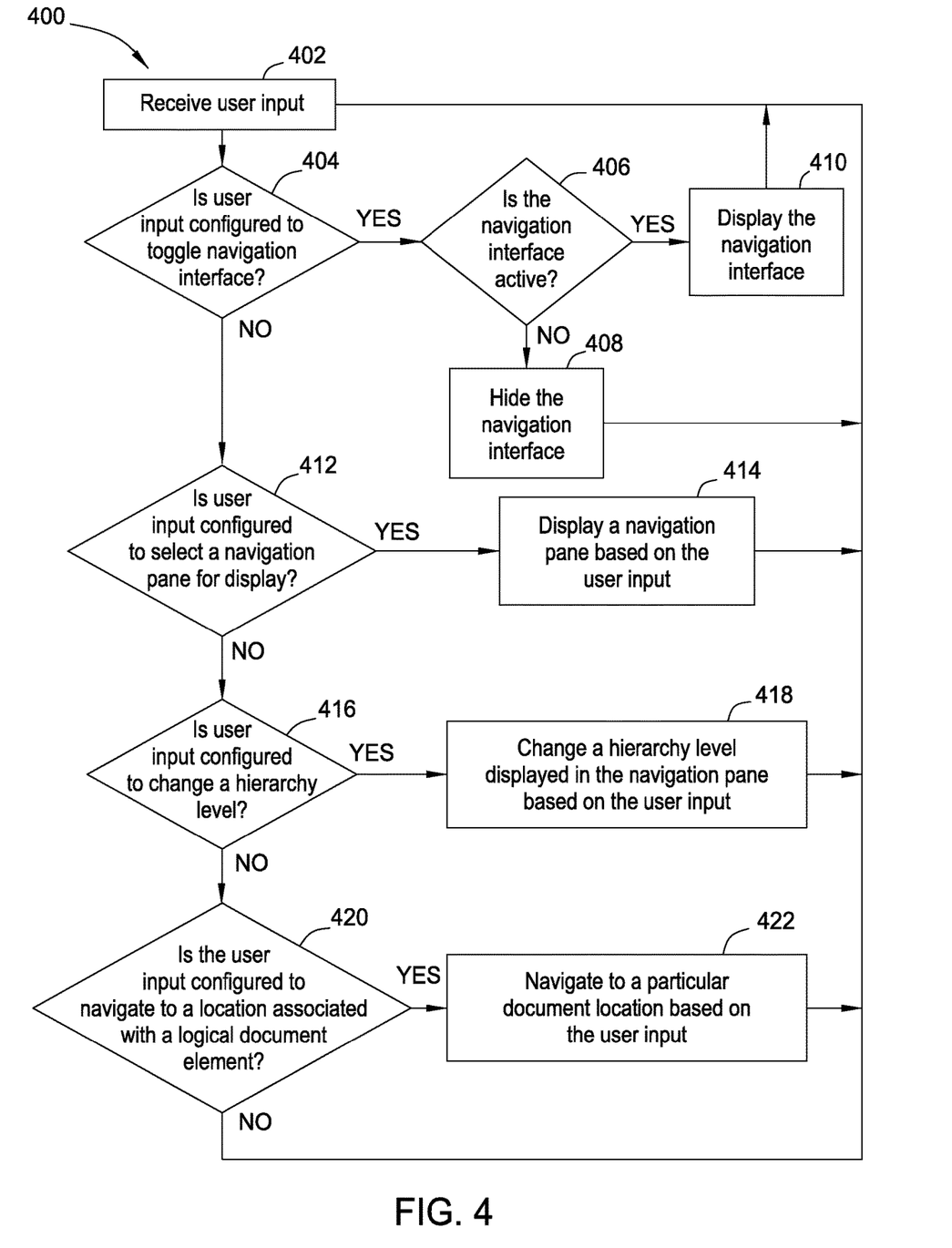
FIG. 4 is a flow diagram of method steps for navigating an electronic document, according to one embodiment of the present invention.

FIG. 4 is a flow diagram of method steps for navigating an electronic document, according to one embodiment of the present invention. Although the method steps are described in conjunction with the system of FIGS. 1-3, persons skilled in the art will understand that any system configured to perform the method steps, in any order, falls within the scope of the present invention.

As shown, a method 400 begins at step 402, where application 150 receives a user input. At step 404, the application 150 determines whether the user input is configured to toggle a navigation interface 200. As described above, in some embodiments, a middle-button mouse-click is a user input configured to toggle a navigation interface 200. If the application 150 determines that the user input is configured to toggle the navigation interface 200, then the method 400 proceeds to step 406, where the application 150 determines whether the navigation interface 200 is active. If the navigation interface is active, then the method proceeds to step 408, in which the application 150 hides the navigation interface. After step 408, the method 400 returns to step 402. If, in step 406, the application 150 determines that the navigation interface is not active, then the method proceeds to step 410, in which the application 150 displays the navigation interface 200. After step 410, the method 400 returns to step 402.

If the user input is not configured to toggle a navigation interface 200, then the method 400 proceeds to step 412. In step 412, application 150 determines whether the user input is configured to select a navigation pane 202 for display. If the user input is configured to select a navigation pane 202 for display, then the method proceeds to step 414. In step 414, the application 150 displays a navigation pane 202 based on the user input. In one example, the user input includes a mouse-over operation targeting a navigation pane selector 221 displayed in a navigation tool 217. If, in step 412, the user input is not configured to select a navigation pane for display, then the method proceeds to step 416.

In step 416, the application 150 determines whether the user input is configured to change a hierarchy level. If the user input is configured to change a current hierarchy level, then the method 400 proceeds to step 418. In step 418, the application 150 changes a current hierarchy level based on the user input. In one embodiment, the user input includes a mouse-tilt operation in which a user tilts a middle mouse button to the left or to the right. In this embodiment, the application 150 expands the hierarchy by increasing the number of the current hierarchy level (i.e., from 2 to 3) when the mouse-tilt operation is directed in a rightwards direction. Similarly, in this embodiment, the application 150 contracts the hierarchy by decreasing the number of the current hierarchy level (i.e., from 2 to 1) when the mouse-tile operation is directed in a leftwards direction. After step 418, the method returns to step 400.

If, in step 416, the application 150 determines that the user input is not configured to change a current hierarchy level, then the method proceeds to step 420. In step 420, the application 150 determines whether the user input is configured to navigate the document 204 to a location associated with a logical document element. If the user input is configured to navigate the document 204, then the method 400 proceeds to step 422. In step 422, the application 150 navigates the document 204 to a particular document location 205 based on the user input. In one embodiment, the user input includes a mouse-scroll operation. In this embodiment, the application 150 changes a current logical document element 207 based on the mouse-scroll operation. More specifically, the application 150 proceeds through logical document elements 207 displayed in the navigation pane 202 until the user stops scrolling the middle mouse button. The application 150 sets the current logical document element 207 to the logical document element 207 that is active when the user stops scrolling the mouse button. The application 150 navigates the document 204 to a document location 205 that is associated with the current logical document element 207.

In another embodiment, the user input includes a mouse-click operation targeting a particular logical document element 207 illustrated in the navigation pane 202. In this embodiment, the application 150 selects the targeted logical document element 207 as the current logical document element 207 and navigates the document 204 to the document location 205 associated with the current logical document element 207. After step 422, the method 400 returns to step 402.

If in step 420, the user input is not configured to navigate to a document location 205, then the user input is not recognized and the method returns to step 402. In various embodiments, application 150 may recognize additional types of user inputs, and act accordingly. Further, the particular order in which the types of user input are processed that is illustrated in FIG. 4 may be altered.

In sum, techniques are provided for logical structure-based document navigation. A document editing application displays a navigation pane for accepting input related to the logical structure-based document navigation. The navigation pane allows selection of logical document elements, and navigation within the document based on such selection. The navigation pane may display a document hierarchy that displays a logical, hierarchical structure of the document. By scrolling a mouse wheel, a user may scroll between hierarchy elements of the document hierarchy. The navigation pane may alternatively display other logical document elements, such as figures. When a particular logical document element is selected, the application navigates to a portion of the document associated with the logical document element.

One advantage of the disclosed technique is that a user is able to quickly navigate to a portion of a document based on a logical structure of the document. Such navigation increases the precision with which a user may select a portion of a document and thereby reduces the amount of time incurred in such navigation operations. Another advantage is that a navigation tool is disclosed that allows a user to quickly and accurately access the logical structure of the document. Thus, application displays the navigation tool only when requested by a user, which increases user productivity by reducing interference with user interface elements that are not requested at any particular moment.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

The invention claimed is:

1. A method for navigating a first electronic document, the method comprising:
    displaying, in a first portion of a display area, a navigation tool that simultaneously depicts at least a first navigation pane selector and a second navigation pane selector, wherein the first portion of the display area is separate from a second portion of the display area that simultaneously depicts one or more portions of the first electronic document, wherein selection of the first navigation pane selector causes a first navigation pane to be simultaneously displayed in a third portion of the display area that is separate from the first portion and the second portion, the first navigation pane depicting a first plurality of logical navigation elements that correspond to a first hierarchical logical relationship between a plurality of elements of the first electronic document, and selection of the second navigation pane selector causes a second navigation pane to be simultaneously displayed in the third portion of the display area, the second navigation pane depicting a second plurality of logical navigation elements that correspond to a second logical relationship between the plurality of elements of the first electronic document, wherein the second logical relationship is different from the first hierarchical logical relationship; and in response to receiving a selection of the first navigation pane selector:

displaying the first navigation pane including the first plurality of logical navigation elements in the third portion of the display area, wherein the first navigation pane is associated with a first hierarchy level of a hierarchical arrangement, and the first plurality of logical navigation elements corresponds to the first hierarchy level;

detecting a first user input;

determining that the first user input is configured to select a first logical navigation element included in the first plurality of logical navigation elements;

selecting the first logical navigation element based on the first user input;

navigating to a first portion of the first electronic document, associated with the first logical navigation element, in the second portion of the display area;

detecting a second user input; determining that the second user input is configured to modify a current hierarchy level associated with the first navigation pane from the first hierarchy level to a second hierarchy level of the hierarchical arrangement; and in response to determining that the second user input is configured to modify the current hierarchy level, modifying the first navigation pane to expand at least one logical navigation element included in the first plurality of logical navigation elements to display a third plurality of logical navigation elements that correspond to the second hierarchy level in the third portion of the display area while simultaneously displaying at least the first navigation pane selector and the second navigation pane selector in the first portion of the display area and the first portion of the first electronic document in the second portion of the display area.

2. The method of claim 1, wherein the first user input comprises a mouse click directed towards the first logical navigation element.

3. The method of claim 1, wherein the first hierarchy level includes a plurality of hierarchy elements that are each associated with a different logical navigation element in the first plurality of logical navigation elements.

4. The method of claim 3, wherein selecting the first logical navigation element comprises determining that the first logical navigation element is adjacent to a current logical navigation element in the current hierarchy level.

5. The method of claim 4, wherein the first user input comprises a mouse wheel scroll operation.

6. The method of claim 1, further comprising accepting a third user input, and, in response, displaying the navigation tool.

7. The method of claim 6, wherein the third user input comprises a mouse-wheel click operation.

8. The method of claim 6, wherein the third user input comprises a mouse-wheel scroll operation.

9. The method of claim 1, wherein the first logical navigation element corresponds to at least one of headings or subheadings that are defined by a third user input.

10. The method of claim 1, wherein a logical navigation element included in the second plurality of logical navigation elements corresponds to one or more figures located in the first electronic document.

11. The method of claim 1, further comprising dismissing the first navigation pane.

12. The method of claim 1, further comprising, in response to detecting the first user input, scrolling through one or more elements of the first electronic document that corresponds to one or more logical navigation elements included in the first plurality of logical navigation elements that are disposed within the hierarchical arrangement at the current hierarchy level, without scrolling through one or more elements of the first electronic document that correspond to one or more logical navigation elements included in the third plurality of logical navigation elements.

13. The method of claim 1, wherein the first logical relationship comprises a hierarchy-based logical relationship, and the second logical relationship comprises a non-hierarchy-based logical relationship.

14. The method of claim 1, wherein the second logical relationship comprises a figure-based logical relationship.

15. The method of claim 1, further comprising, in response to receiving a third user input comprising a mouse-wheel scroll operation, navigating to a second portion of the first electronic document associated with a second logical navigation element that is adjacent to the first logical navigation element according to the first hierarchy level.

16. One or more non-transitory computer-readable storage media storing instructions that, when executed by one or more processors, cause the one or more processors to navigate a first electronic document by performing steps of:

displaying, in a first portion of a display area, a navigation tool that simultaneously depicts at least a first navigation pane selector and a second navigation pane selector, wherein the first portion of the display area is separate from a second portion of the display area that simultaneously depicts one or more portions of the first electronic document, wherein selection of the first navigation pane selector causes a first navigation pane to be simultaneously displayed in a third portion of the display area that is separate from the first portion and the second portion, the first navigation pane depicting a first plurality of logical navigation elements that correspond to a first hierarchical logical relationship between a plurality of elements of the first electronic document, and selection of the second navigation pane selector causes a second navigation pane to be simultaneously displayed in the third portion of the display area, the second navigation pane depicting a second plurality of logical navigation elements that correspond to a second logical relationship between the plurality of elements of the first electronic document, wherein the second logical relationship is different from the first hierarchical logical relationship; and in response to receiving a selection of the first navigation pane selector:

displaying the first navigation pane including the first plurality of logical navigation elements in the third portion of the display area, wherein the first navigation pane is associated with a first hierarchy level of a hierarchical arrangement, and the first plurality of logical navigation elements corresponds to the first hierarchy level;

detecting a first user input;

determining that the first user input is configured to select a first logical navigation element included in the first plurality of logical navigation elements;

selecting the first logical navigation element based on the first user input;

navigating to a first portion of the first electronic document, associated with the first logical navigation element, in the second portion of the display area;

detecting a second user input; determining that the second user input is configured to modify a current hierarchy level associated with the first navigation pane from the first hierarchy level to a second hierarchy level of the hierarchical arrangement; and in response to determining that the second user input is configured to modify the current hierarchy level, modifying the first navigation pane to expand at least one logical navigation element included in the first plurality of logical navigation elements to display a third plurality of logical navigation elements that correspond to the second hierarchy level in the third portion of the display area while simultaneously displaying at least the first navigation pane selector and the second navigation pane selector in the first portion of the display area and the first portion of the first electronic document in the second portion of the display area.

17. The one or more non-transitory computer-readable storage media of claim 16, wherein the first user input comprises a mouse click directed towards the first logical navigation element.

18. The one or more non-transitory computer-readable storage media of claim 16, wherein the first hierarchy level includes a plurality of hierarchy elements that are each associated with a different logical navigation element in the first plurality of logical navigation elements.

19. The one or more non-transitory computer-readable storage media of claim 18, wherein selecting the first logical navigation element comprises determining that the first logical navigation element is adjacent to a current navigation document element in the current hierarchy level.

20. The one or more non-transitory computer-readable storage media of claim 19, wherein the first user input comprises a mouse wheel scroll operation.

21. The one or more non-transitory computer-readable storage media of claim 16, further storing instructions that cause the one or more processors to accept a third user input, and, in response, display the navigation tool.

22. The one or more non-transitory computer-readable storage media of claim 21, wherein the third user input comprises a mouse-wheel click operation.

23. The one or more non-transitory computer-readable storage media of claim 21, wherein the third user input comprises a mouse-wheel scroll operation.

24. A computer system for navigating a first electronic document, the computer system comprising:

one or more memories including instructions; and one or more processors that are coupled to the one or more memories and, when executing the instructions, are configured to:

display, in a first portion of a display area, a navigation tool that simultaneously depicts at least a first navigation pane selector and a second navigation pane selector, wherein the first portion of the display area is separate from a second portion of the display area that simultaneously depicts one or more portions of the first electronic document, wherein selection of the first navigation pane selector causes a first navigation pane to be simultaneously displayed in a third portion of the display area that is separate from the first portion and the second portion, the first navigation pane depicting a first plurality of logical navigation elements that correspond to a first hierarchical logical relationship between a plurality of elements of the first electronic document, and selection of the second navigation pane selector causes a second navigation pane to be simultaneously displayed in the third portion of the display area, the second navigation pane depicting a second plurality of logical navigation elements that correspond to a second logical relationship between the plurality of elements of the first electronic document, wherein the second logical relationship is different from the first hierarchical logical relationship; and in response to receiving a selection of the first navigation pane selector:

display the first navigation pane including the first plurality of logical navigation elements in the third portion of the display area, wherein the first navigation pane is associated with a first hierarchy level of a hierarchical arrangement, and the first plurality of logical navigation elements corresponds to the first hierarchy level;

detect a first user input;

determine that the first user input is configured to select a first logical navigation element included in the first plurality of logical navigation elements;

select the first logical navigation element based on the first user input;

navigate to a first portion of the first electronic document, associated with the first logical navigation element, in the second portion of the display area;

detect a second user input;

determine that the second user input is configured to modify a current hierarchy level associated with the first navigation pane from the first hierarchy level to a second hierarchy level of the hierarchical arrangement; and in response to determining that the second user input is configured to modify the current hierarchy level, modify the first navigation pane to expand at least one logical navigation element included in the first plurality of logical navigation elements to display a third plurality of logical navigation elements that correspond to the second hierarchy level in the third portion of the display area while simultaneously displaying at least the first navigation pane selector and the second navigation pane selector in the first portion of the display area and the first portion of the first electronic document in the second portion of the display area.

25. The computer system of claim 24, wherein:

the first hierarchy level includes a plurality of hierarchy elements that are each associated with a different logical navigation element in the first plurality of logical navigation elements, selecting the first logical navigation element comprises determining that the first logical document element is adjacent to a current logical document element in the current hierarchy level, and the first user input comprises a mouse wheel scroll operation.

* * * * *